(12) United States Patent
Jordan et al.

(10) Patent No.: US 7,147,207 B2
(45) Date of Patent: Dec. 12, 2006

(54) ACTUATOR APPARATUS FOR CONTROLLING A VALVE MECHANISM OF A SUSPENSION SYSTEM

(75) Inventors: Brian Jordan, Chicago, IL (US); Kevin Wesling, Lombard, IL (US); Christopher Shipman, Chicago, IL (US); Eric Swaidner, Colorado Springs, CO (US); John Cheever, Chicago, IL (US)

(73) Assignee: SRAM Corporation, Chicago, IL (US)

( * ) Notice: Subject to any disclaimer, the term of this patent is extended or adjusted under 35 U.S.C. 154(b) by 0 days.

(21) Appl. No.: 10/904,340

(22) Filed: Nov. 4, 2004

(65) Prior Publication Data

US 2006/0091345 A1    May 4, 2006

(51) Int. Cl.
*F16K 31/44* (2006.01)
(52) U.S. Cl. .............. 251/263; 267/64.18; 188/322.22
(58) Field of Classification Search ............... 251/251, 251/262, 263; 267/64.15, 64.18, 293; 188/321.11, 188/322.15, 322.22
See application file for complete search history.

(56) References Cited

U.S. PATENT DOCUMENTS

| | | | |
|---|---|---|---|
| 2,745,517 A | 5/1956 | Zook | |
| 4,036,335 A | 7/1977 | Thompson | |
| 4,305,486 A | 12/1981 | Cowan | |
| 4,488,704 A | * 12/1984 | Wicker | 251/265 |
| 5,505,281 A | 4/1996 | Lee | |
| 6,279,703 B1 | 8/2001 | Mete | |
| 6,360,857 B1 | 3/2002 | Fox | |
| 2003/0234144 A1 | 12/2003 | Fox | |

FOREIGN PATENT DOCUMENTS

GB     1415608     11/1975

OTHER PUBLICATIONS

Mountain Bike Action Suspension Special, pp. 75-78, Feb. 1991.
Ceriani Product Catalog, Circa 1991.
One set of five pages of photographs of a Ceriani Fork.
Cross-sectional schematic of a Ceriani Fork.

* cited by examiner

*Primary Examiner*—Edward K. Look
*Assistant Examiner*—John K. Fristoe, Jr.
(74) *Attorney, Agent, or Firm*—Milan Milosevic; Lisa Serdynski

(57) ABSTRACT

An actuator apparatus controls a valve mechanism of a suspension system. The apparatus includes a valve actuating assembly and an adjuster assembly. The valve actuating assembly is operatively connected to the valve mechanism and is operable between at least two rider-selectable positions to adjust the valve mechanism between various suspension settings. The adjuster assembly is operatively connected to the valve actuating assembly for adjusting the damping characteristics corresponding to at least one of the positions of the valve actuating assembly independently of the damping characteristics corresponding to another position of the valve actuating assembly.

12 Claims, 18 Drawing Sheets

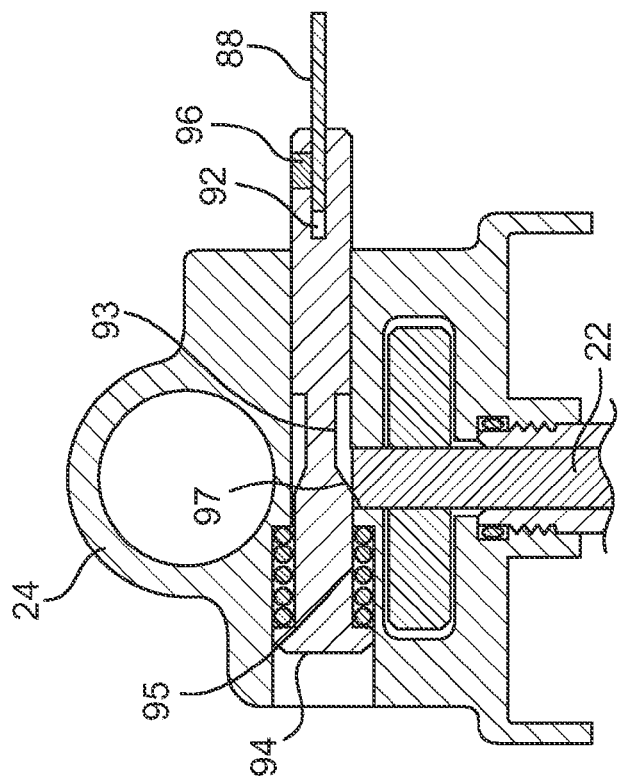
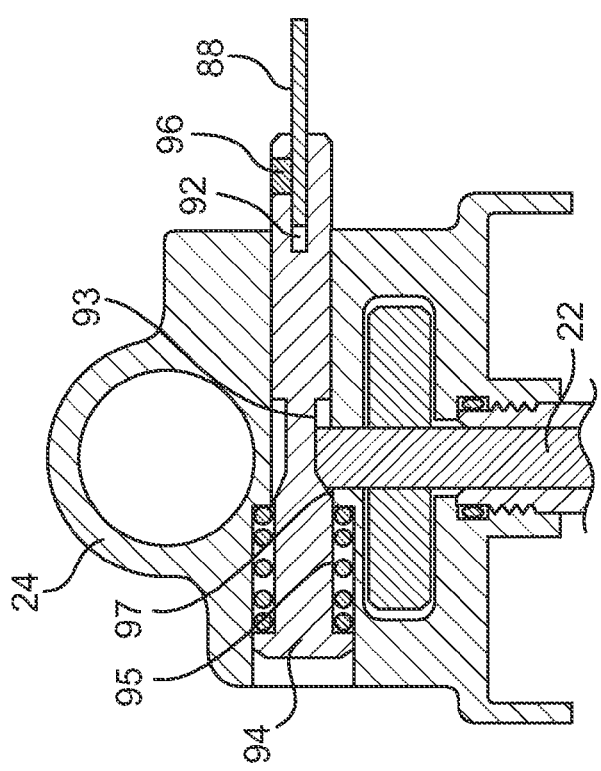
FIG. 8c
FIG. 8b

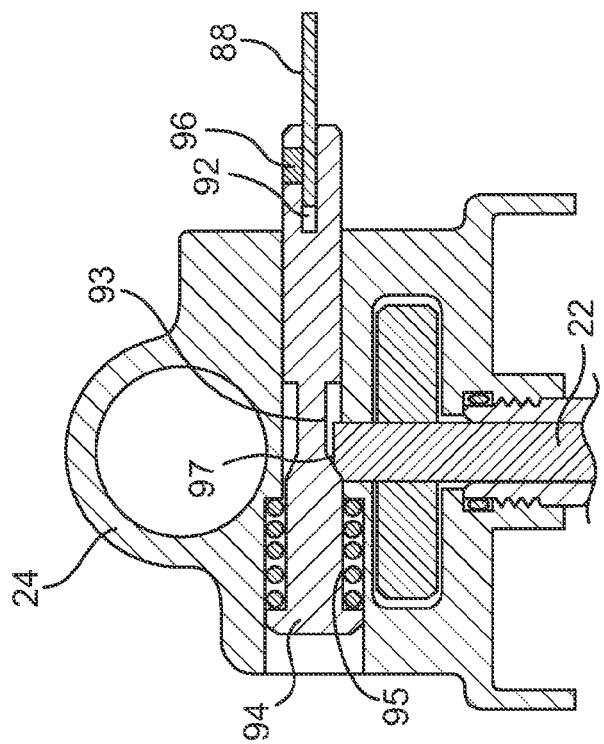
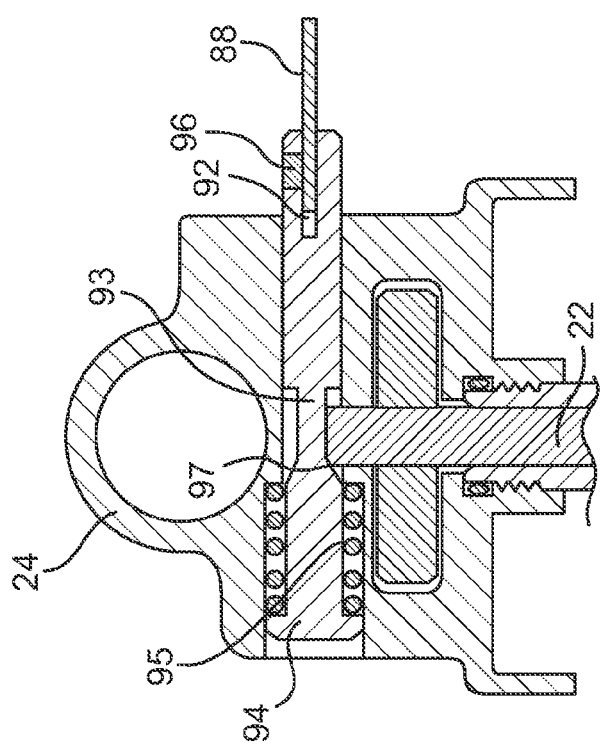

ACTUATOR APPARATUS FOR CONTROLLING A VALVE MECHANISM OF A SUSPENSION SYSTEM

BACKGROUND OF THE INVENTION

The present invention relates to suspension systems and more particularly to an actuator apparatus for controlling a valve mechanism of a suspension system that includes a valve actuating assembly operable between at least two rider-selectable positions and an adjuster assembly for adjusting the damping characteristics of at least one of the rider-selectable positions.

Typically, a suspension system includes a piston disposed in a cylinder of housing for reciprocation therein. The piston divides the cylinder into two opposed chambers. A piston shaft is connected to the piston and extends from the piston to a position outside of the cylinder. A fluid, such as oil, or air, or the like, is normally contained in the chambers. In use, the fluid passes between the chambers in response to reciprocation of the piston in the cylinder to affect damping.

The damping characteristics of a suspension system can affect the quality of performance provided by a shock absorber for a given application. Damping characteristics are affected by various factors such as rider weight, rider skill, terrain conditions, etc. Accordingly, it is desirable to provide a suspension system wherein the damping characteristics are adjustable. Further, it is advantageous to provide shock absorbers that are externally adjustable by the rider.

A typical design for a damping adjuster uses an adjuster rod that extends down the center of the piston shaft and engages the valve mechanism or performs the function of the valve mechanism. Adjustment is commonly made in either of two ways, the adjuster rod is moved axially (up or down) to alter damping or the adjuster rod is rotated to alter damping. For example, a cam attached to a lever may be engageable with the adjuster rod to vary the axial position of the rod. One problem associated with this configuration is that any given angular position of the lever/cam corresponds to exactly one position of the adjuster rod. This limits the ability of the rider to customize the damping characteristics of the suspension system to suit the terrain or the rider's particular riding style.

SUMMARY OF THE INVENTION

The objective of the present invention is to provide an actuator apparatus for adjusting the damping of a suspension system that allows the rider to customize the damping characteristics of the system to suit the terrain or the rider's particular riding style. The present invention provides an actuator apparatus for controlling a valve mechanism for a suspension system. The actuator apparatus generally includes a valve actuating assembly and an adjuster assembly. The valve actuating assembly adjusts the valve mechanism between various suspension settings. The adjuster assembly is operatively connected to the valve actuating assembly for adjusting the damping characteristics corresponding to at least one of the positions of the valve actuating assembly independently of the damping characteristics corresponding to another position of the valve actuating assembly.

In one embodiment of the present invention, the valve actuating assembly includes a driver movable to adjust the valve mechanism between various suspension settings, and a selector operatively connected to the driver and operable between the rider-selectable positions. The selector includes a lever operable between the rider-selectable positions and a camshaft operatively connected to the lever. The camshaft has a rotation axis and at least two cam surfaces corresponding to the rider-selectable positions of the lever. The cam surfaces are engageable with the driver and at least one cam surface is substantially parallel to the axis and at least another cam surface is at an angle relative to the camshaft axis. The adjuster assembly includes a knob operatively connected to the camshaft to axially displace the camshaft to vary the point at which the driver engages the angled cam surface, thereby providing various positions of the driver along its axis, resulting in various damping characteristics. Alternatively, the knob may be replaced with threads on the camshaft that engage threads on a housing or cylinder of the suspension system.

In another embodiment of the present invention, the above-mentioned lever may be replaced by a control cable that is pulled or released by a remote actuator operable between the rider-selectable positions and located on a handlebar of the bicycle. The control cable is operatively connected to the camshaft. As in the previous embodiments, the camshaft has three cam surfaces. Two of the cam surfaces are substantially parallel to the camshaft axis and the third cam surface is at an angle relative to the camshaft axis. The adjuster assembly includes a cable adjustment device that adjusts the length of the cable. By adjusting the length of the cable, the axial position of the camshaft is adjusted. Accordingly, the point at which the driver engages the angled cam surface is adjusted by adjusting the cable length, thereby adjusting the damping characteristics of the adjustable position without affecting the damping characteristics of the other two positions corresponding to the substantially parallel cam surfaces.

In another embodiment of the present invention, a lever is rigidly attached to the camshaft having three cam surfaces. However, in this embodiment all three of the cam surfaces are substantially parallel to the camshaft axis and a setscrew engages the camshaft to prevent axial movement of the camshaft while still allowing rotational movement of the camshaft. A detent mechanism positions the lever such that when one of the three rider-selectable positions is selected, the corresponding cam surface is perpendicular to the driver. This embodiment further includes a stop element that prevents over-rotation of the lever. The adjuster assembly includes a limit screw. The limit screw is configured such that when it is fully retracted all three of the cam surfaces are perpendicular to the driver. However, when the limit screw is partially or fully advanced, the stop element contacts the end of the limit screw and prevents the lever and the camshaft from fully rotating to the third position. In this position, the cam surface corresponding to the third position is prevented from rotating perpendicular to the driver and is held at an angle relative to the driver. Accordingly, the amount in which the limit screw is advanced or retracted determines the damping characteristics of the third position of lever.

In yet another embodiment of the present invention, the camshaft is only rotatable by the lever and is axially fixed by a setscrew. The camshaft has three cam surfaces that are substantially parallel to the camshaft axis and correspond to the three rider-selectable positions of the lever. The adjuster assembly includes a knob having a through-hole for receiving the driver. The knob is threaded into a housing enclosing the valve mechanism such that as the knob is rotated it moves along the driver axis and may cause the driver to displace along its axis. When the lever is rotated to the adjustable position, a shoulder of the driver contacts the knob and further rotation of the lever causes the driver to disengage from the camshaft. In this third position, the axial position of the driver is determined by the axial position of the knob, not by the cam surface.

These and other features and advantages of the present invention will be more fully understood from the following description of certain embodiments of the invention, taken together with the accompanying drawings.

BRIEF DESCRIPTION OF THE DRAWINGS

In the drawings:

FIGS. 8a–8c, 9a–9c and 10a–10c are cross-sectional views of another embodiment of the present invention, showing various positions of a valve actuating assembly;

DETAILED DESCRIPTION

Figure 1:
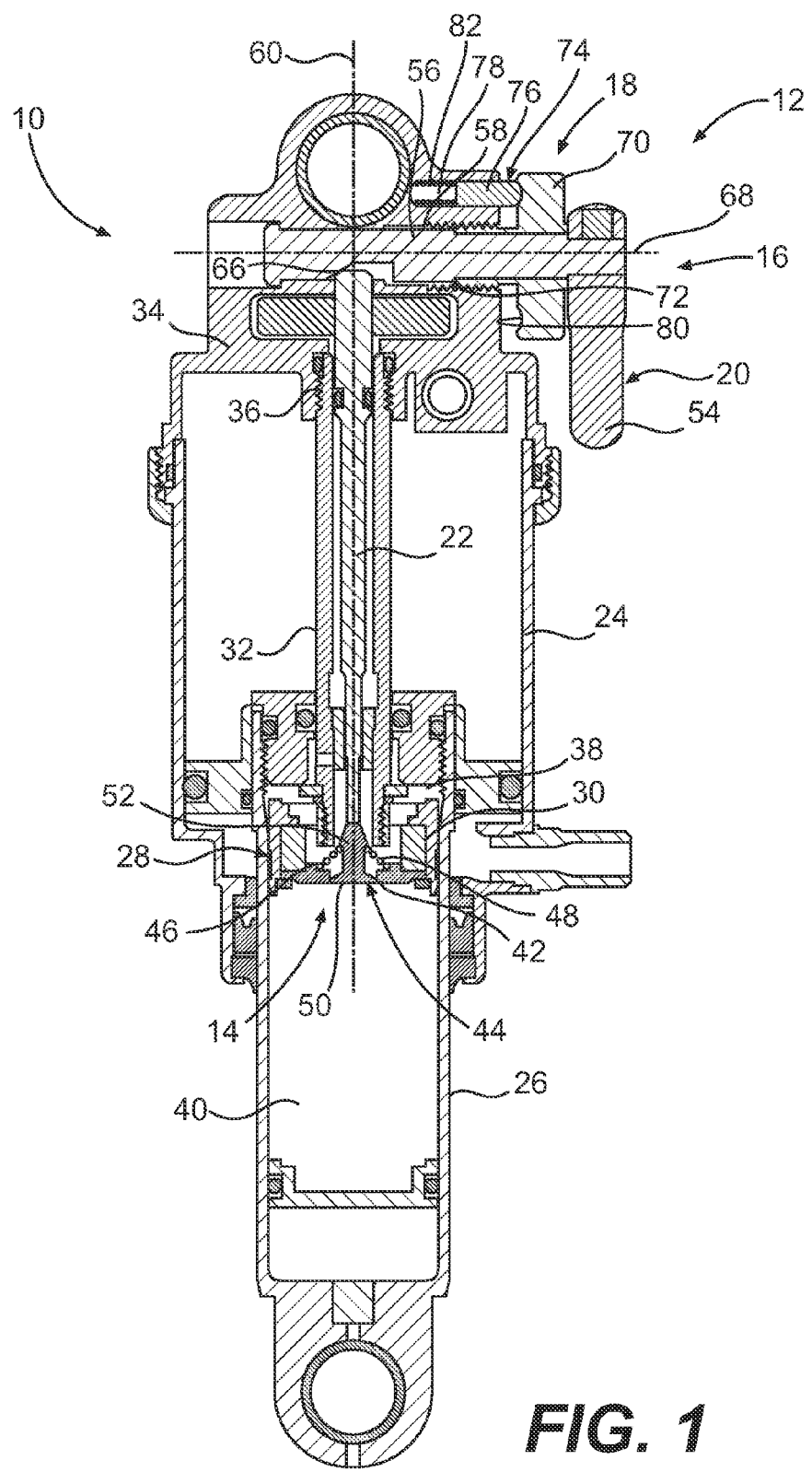
FIG. 1 is a cross-sectional view of the suspension system in accordance with one embodiment of the present invention.

FIGS. 1–6 illustrate a suspension system 10 having an actuator apparatus 12 for controlling a valve mechanism 14 in accordance with one embodiment of the present invention. The actuator apparatus 12 generally includes a valve actuating assembly 16 operable between at least two rider-selectable positions to adjust the valve mechanism 14 between various suspension settings and an adjuster assembly 18 operatively connected to the valve actuating assembly 16 to adjust the damping characteristics corresponding to at least one of the positions of the valve actuating assembly 16 independently of the damping characteristics corresponding to another position of the valve actuating assembly 16. The valve actuating assembly 16 includes a selector 20 having at least two rider-selectable positions and a driver 22 movable to adjust the valve mechanism 14 between various suspension settings. In this embodiment, the selector 20 has three rider-selectable positions representing open, lockout and adjustable positions. The adjuster assembly 18, formed separate from the valve actuating assembly 16, adjusts the damping characteristics of the adjustable position of the selector 20.

The suspension system 10 generally includes first and second cylinders 24, 26 displaceable relative to each other during compression and rebound strokes of the suspension system 10. The second cylinder 26 encloses a piston assembly 28 having a piston 30 slidably mounted in the second cylinder 26 and a hollow piston rod 32 extending between the piston 30 and a distal end 34 of the first cylinder 24. The piston rod 32 is rigidly connected to the distal end 34 of the first cylinder 24 by a threaded engagement 36. The piston 30 divides the second cylinder 26 into first and second fluid chambers 38, 40. The piston 30 has a fluid passageway 42 for allowing fluid to pass between the two fluid chambers 38, 40 in response to reciprocation of the piston 30 in the second cylinder 26 to affect damping.

The second cylinder 26 further encloses the valve mechanism 14 for controlling the fluid flow between the first and second fluid chambers 38, 40. The valve mechanism 14 includes a valve 44 and a valve seat 46, the valve 44 displaceable relative to the valve seat 46. The valve 44 is biased toward a closed position by a valve spring 48. The valve 44 further includes a valve head 50 and a valve stem 52 connected to the valve head 50, the valve head 50 configured to sealingly engage the valve seat 46, the valve stem 52 configured to interface with the driver 22. The driver 22 extends through the hollow piston rod 32 and is displaceable relative to the piston rod 32 to engage the valve stem 52 of the valve 44.

Figure 2:
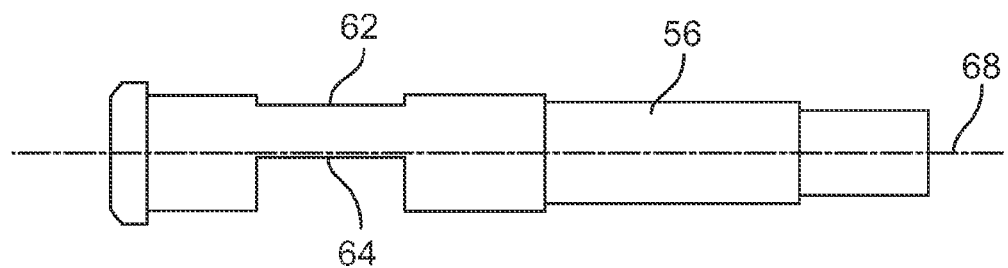
FIG. 2 is a top view of a camshaft included in the suspension system of FIG. 1.
Figure 3:
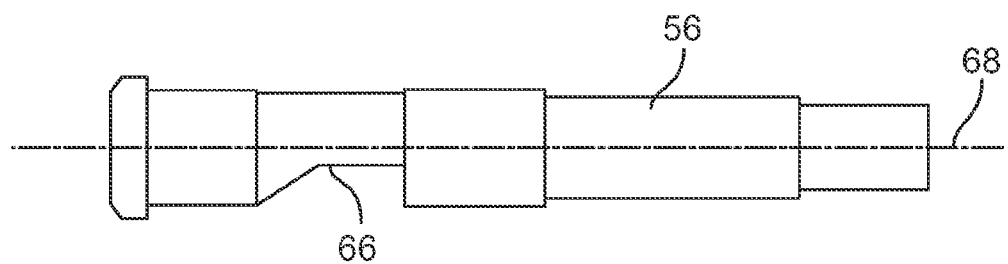
FIG. 3 is a side view of the camshaft included in the suspension system of FIG. 1.

In this embodiment, the selector 20 includes a rider-operated lever 54 and a camshaft 56 rigidly connected to the lever 54. The camshaft 56 is received in an opening 58 of the first cylinder 24 and is engageable with the driver 22 to axially displace the driver 22 along axis 60. As shown in FIGS. 2 and 3, the camshaft 56 has three cam surfaces 62, 64, 66 engageable with the driver 22 which correspond to the three rider-selectable positions of the selector 20, open, lockout and adjustable positions, respectively. Cam surfaces 62, 64 are substantially parallel to an axis 68 of the camshaft 56 and cam surface 66 is oriented at an angle relative to the axis 68 of the camshaft 56. The driver 22 is biased against the camshaft 56 by the pressurized damping fluid contained in the chambers 38, 40. Alternatively, the driver 22 may be biased against the camshaft 56 by a coil spring or the like.

In this embodiment, the adjuster assembly 18 includes a knob 70 threaded into the opening 58 of the first cylinder 24 and is located between the lever 54 and a shoulder 72 of the camshaft 56. The camshaft 56 extends through the knob 70 and is secured to the lever 54. As the knob 70 is threaded in and out of the opening 58, the camshaft 56 is displaced along its axis 68. The adjuster assembly 18 may further include a detent mechanism 74 for holding the knob 70 in a particular angular position. The detent mechanism 74 may include a detent rod 76 received in a cavity 78 of the first cylinder 24 and engageable with a plurality of detent notches 80 on the knob 70. A detent spring 82 biases the detent rod 76 against one of the detent notches 80 on the knob 70.

The lever 54 is operable between three positions, open, lockout and adjustable. When the lever 54 is rotated to the open position, the camshaft 56 is rotated until the cam surface 62 engages the driver 22 to axially displace the driver 22 to engage or displace the valve stem 52, thereby opening the valve 44 and allowing fluid to flow between the chambers 38, 40. So positioned, fluid flow is permitted between the chambers 38, 40 in response to reciprocal displacement of the piston 30 within the second cylinder 26. When the lever 54 is rotated to the lockout position, the camshaft 56 is rotated until the cam surface 64 engages the driver 22 to axially displace the driver 22 away from the valve stem 52, thereby substantially closing the valve 44 and preventing fluid to flow between the chambers 38, 40.

Figure 4A:
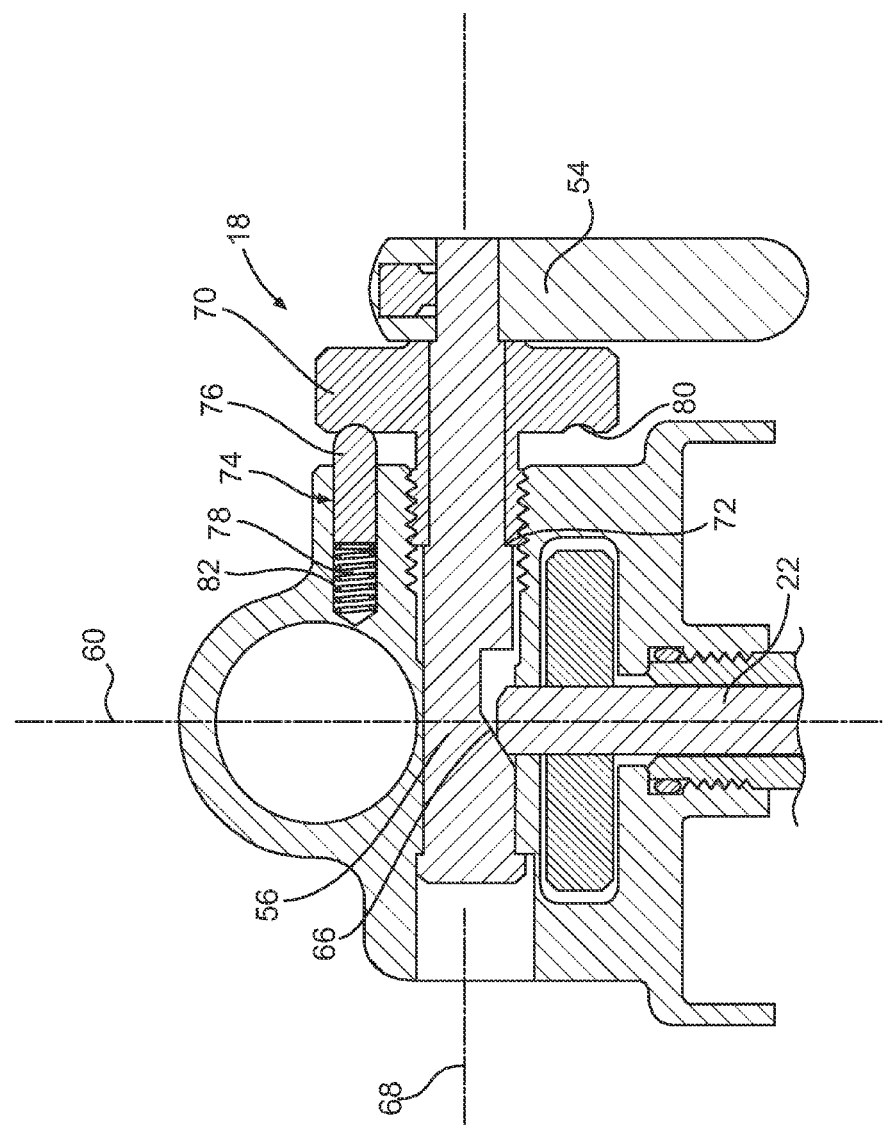
FIGS. 4a–4b are partial cross-sectional views of the suspension system of FIG. 1, showing different positions of a valve actuating assembly.
Figure 4B:
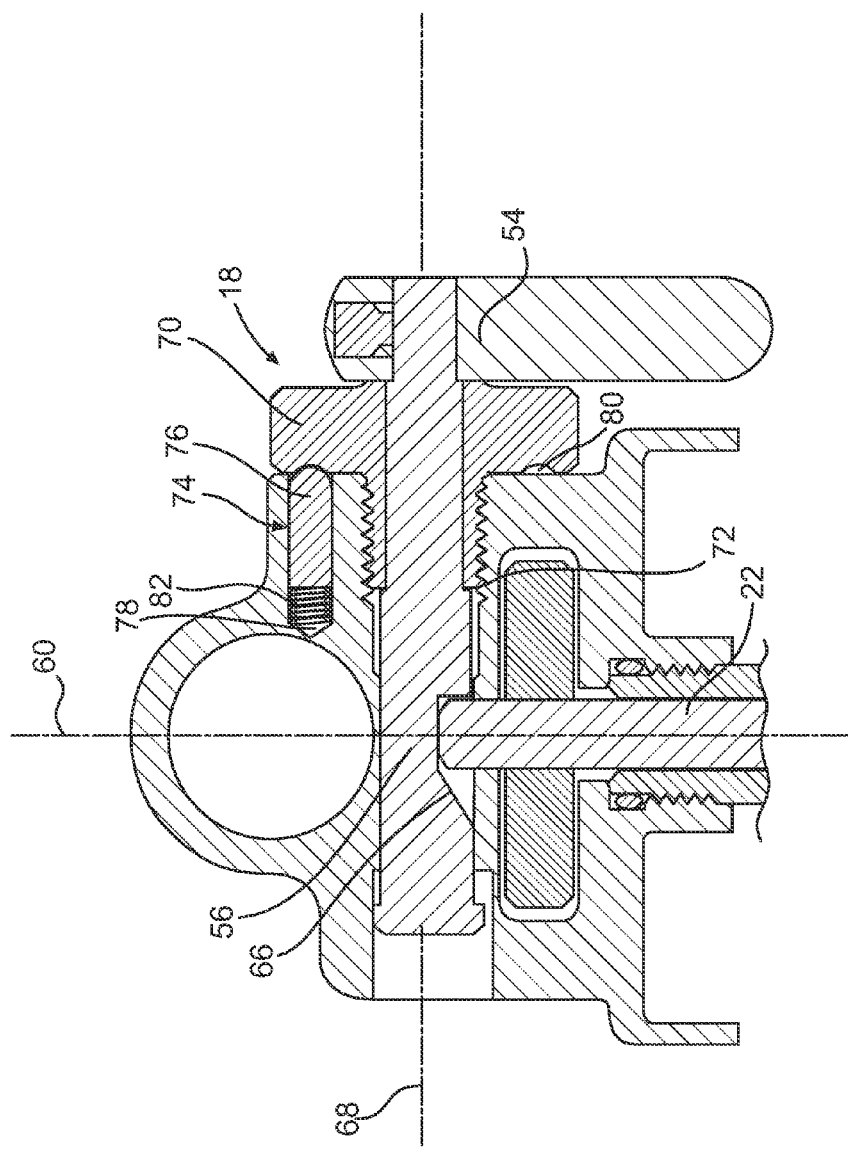

When the lever 54 is rotated to the adjustable position, the driver 22 engages the angled cam surface 66. To further adjust the damping characteristics of the system, the knob 70 is rotated to axially move the camshaft 56, thereby modifying the point of engagement of the driver 22 along the angled cam surface 66. FIG. 4a shows the knob 70 rotated to its minimum engagement with the threads of the first cylinder 24, which causes the driver 22 to engage the angled cam surface 66 at its lowest point. FIG. 4b shows the knob 70 rotated to its maximum engagement with the threads of the first cylinder 24, which causes the driver 22 to be at the highest point on the angled cam surface 66. The knob 70 may be rotated anywhere between these two extreme positions, thereby providing various positions of the driver 22 along the axis 60, resulting in various damping characteristics.

Figure 5C:
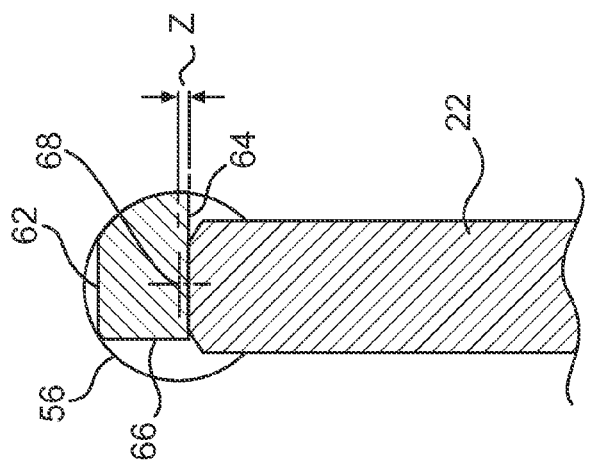
FIGS. 5a–5c and 6a–6c are partial cross-sectional views of the suspension system of FIG. 1, showing various positions of the camshaft engaging a driver of the valve actuating assembly.
Figure 5B:
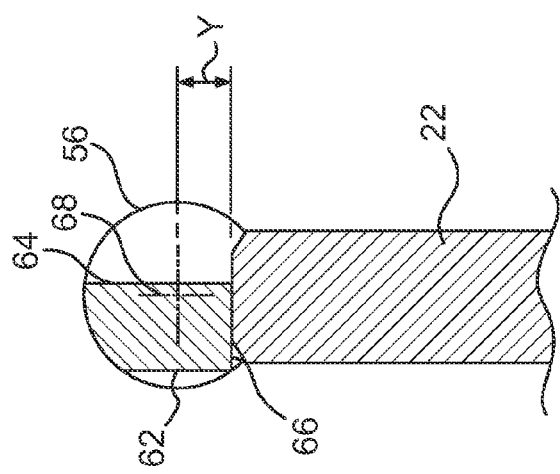
Figure 5A:
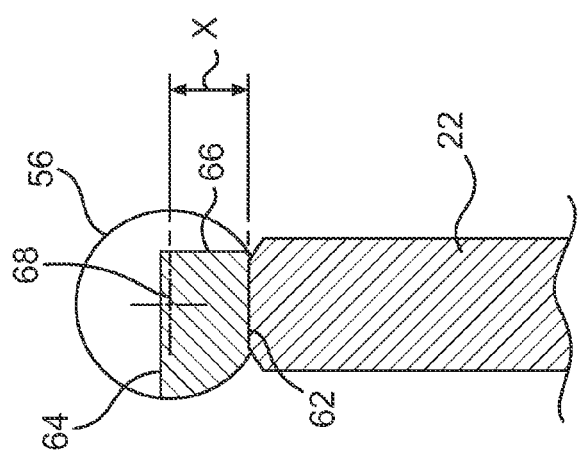
Figure 6A:
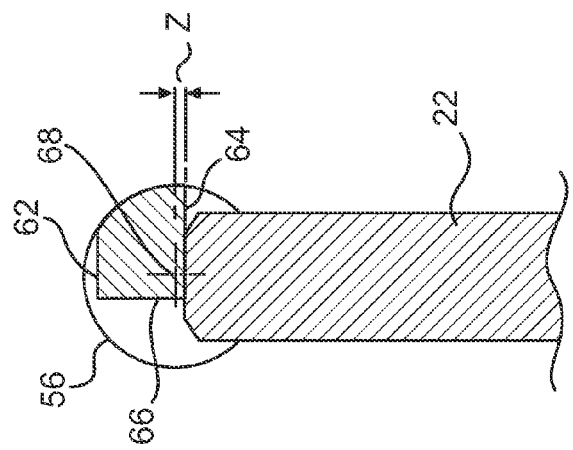
Figure 6B:
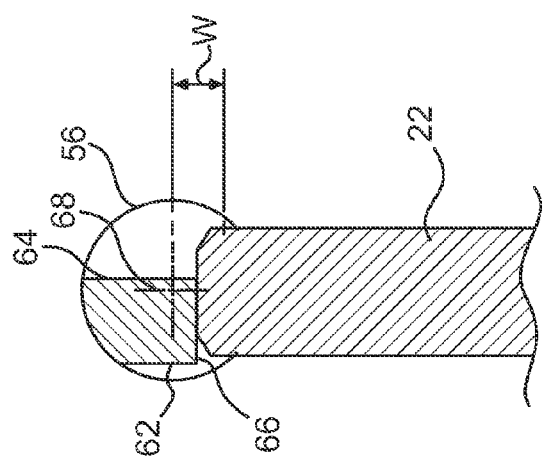
Figure 6C:
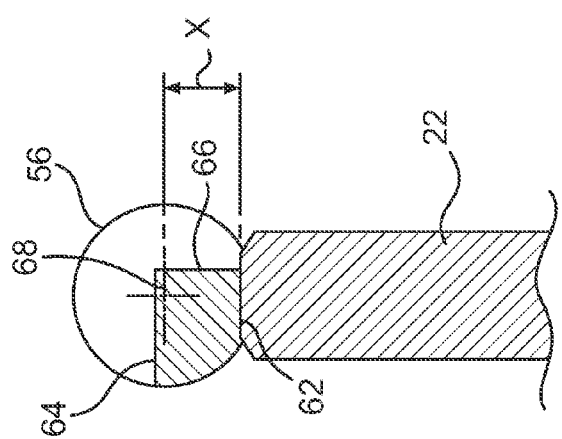

The adjuster assembly 18 is configured such that the damping characteristics of the adjustable position of the lever 54 may be adjusted without affecting the damping characteristics of the open and lockout positions of the lever 54, this is illustrated in FIGS. 5a–5c and 6a–6c. In FIGS. 5a–5c, the camshaft 56 is in the same axial position as shown in FIG. 4a. Looking to FIG. 5a, when the lever 54 is rotated such that the cam surface 62 engages the driver 22, the distance between the end of the driver 22 and the axis 68 is X. Looking to FIG. 5b, when the lever 54 is rotated such that the cam surface 66 engages the driver 22, the distance between the end of the driver 22 and axis 68 is Y. And as shown in FIG. 5c, when the lever 54 is rotated such that the cam surface 64 engages the driver 22, the distance between the end of the driver 22 and axis 68 is Z. Similarly, in FIGS. 6a–6c, the camshaft 56 is in the same axial position as shown in FIG. 4b. Comparing FIGS. 5a and 6a, there is no difference in the axial positions of the driver 22. Similarly, comparing FIGS. 5c and 6c, there is no difference in the axial positions of the driver 22. However, in comparing FIGS. 5b and 6b, there is a difference between the axial positions of the driver 22. In FIG. 5b, the driver 22 is at a distance Y from the axis 68 and the driver 22 of FIG. 6b is at a different distance W from the axis 68. Accordingly, the axial position of the driver 22, when engaged with the cam surfaces 62, 64, is independent of the axial position of the cam shaft 56 and, in contrast, the axial position of the driver 22, when engaged with the cam surface 66 is dependent on the axial position of the cam shaft 56. Therefore, the knob 70 may be rotated to vary the damping characteristics of the rider-selectable position corresponding to the cam surface 66, without affecting the damping characteristics of the other rider-selectable positions corresponding to the cam surfaces 62, 64.

Figure 7A:
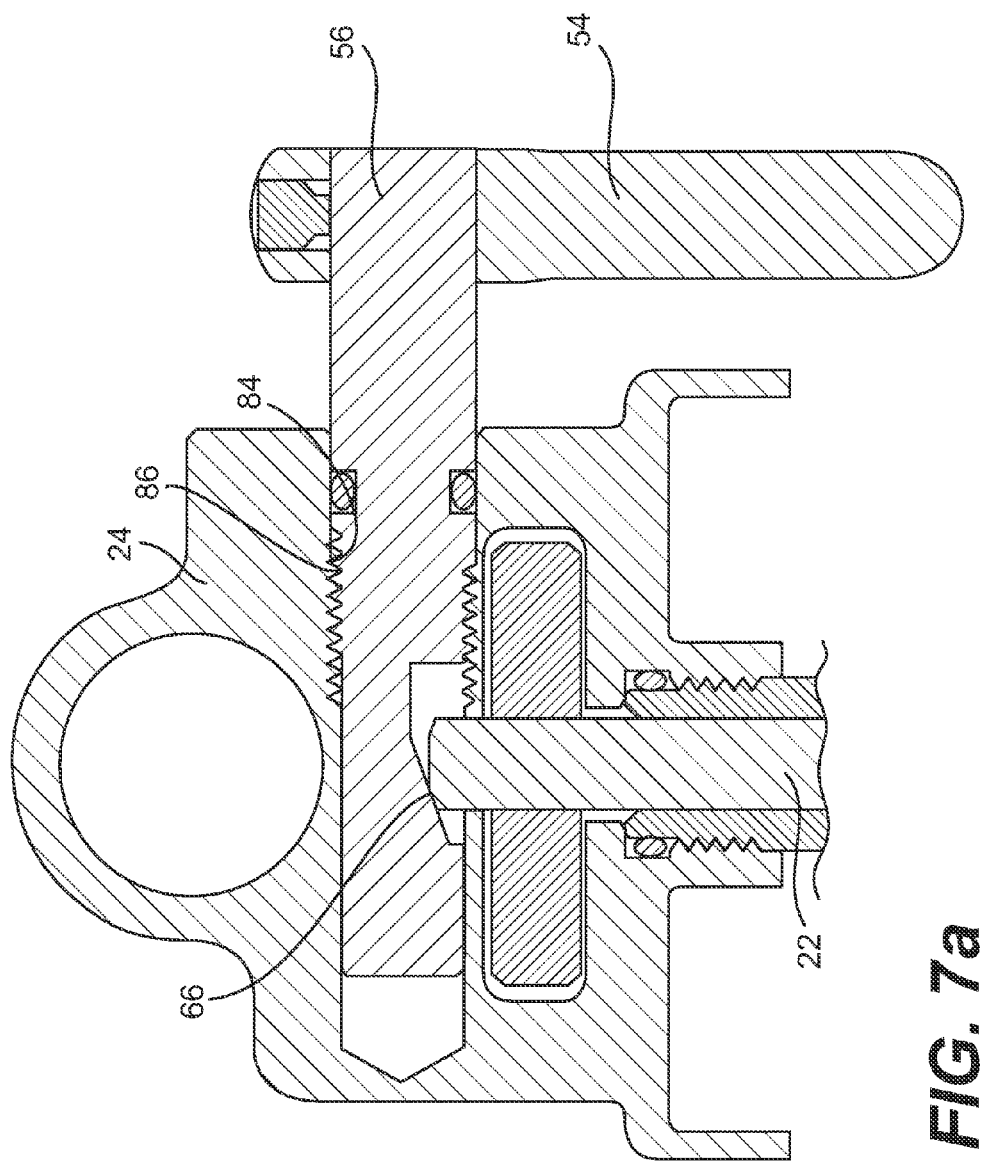
FIG. 7a–7c are partial cross-sectional views of another embodiment of the present invention, showing various positions of a valve actuating assembly.
Figure 7B:
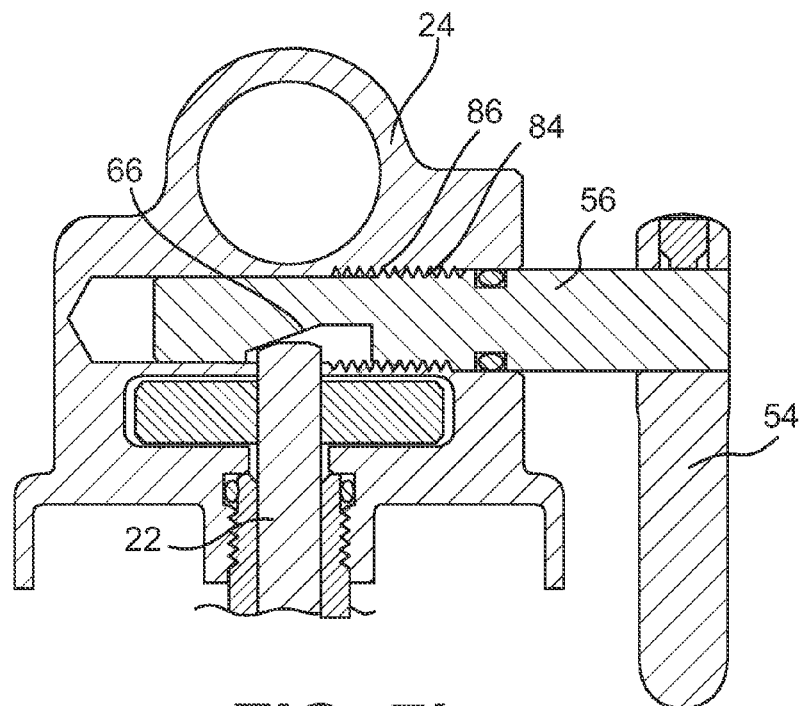
Figure 7C:
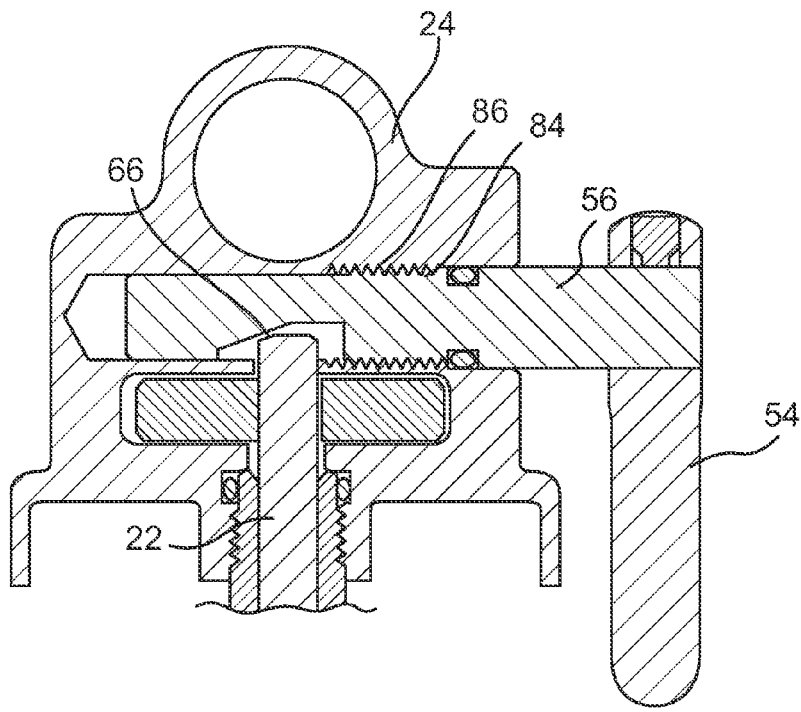

Another embodiment of the present invention is shown in FIGS. 7a–7c. In this embodiment, the function of the knob 70 of the previous embodiments is replaced with threads 84 on the camshaft 56 that engage threads 86 on the first cylinder 24. The adjuster assembly 18 is formed integrally with the selector 20. As in the embodiment shown in FIGS. 1–6, the lever 54 is rigidly connected to the camshaft 56 and the camshaft 56 has the same three surfaces 62, 64, 66 shown in FIGS. 2 and 3 at one end. Cam surfaces 62, 64 are substantially parallel to the axis 68 of the camshaft 56 and cam surface 66 is at an angle relative to the axis 68. Rotation of the lever 54 through its three rider-selectable positions that correspond to the cam surfaces 62, 64, 66 causes the driver 22 to be held at three different positions. In order to change the point, at which the driver 22 engages the angled cam surface 66, the lever 54 is rotated through one or more complete revolutions. For example, the lever 54 shown in FIG. 7b has been rotated through one complete revolution compared to the lever 54 shown in FIG. 7a, causing the camshaft 56 to axially displace by an amount equal to one thread pitch and the driver 22 to engage the angled cam surface 66 at a low point on surface 66. However, when the lever 54 is rotated such that the cam surfaces 62, 64 engage the driver 22, the driver 22 position has not changed. FIG. 7c shows the lever 54 rotated through one complete revolution in the opposite direction, causing the camshaft 56 to move axially in the opposite direction, resulting in the driver 22 engaging the angled cam surface 66 at a higher point than in FIG. 7b.

Another embodiment of the present invention is shown in FIGS. 8a–8c, 9a–9c and 10a–10c. In this embodiment, the lever 54 of the previous embodiments is replaced by a control cable 88 that is pulled or released by a remote actuator 90 located on a handlebar of the bicycle. The remote actuator 90 may be a lever rotatable to take-up the control cable 88, which is commonly known to one skilled in the art in the bicycle industry. The control cable 88 is received in an opening 92 in a camshaft 94 and is retained in the opening 92 by a setscrew 96. As in the previous embodiments, the camshaft has three surfaces 93, 95, 97. Two of the surfaces 93, 95 are substantially parallel to the camshaft axis 68 and the third surface 97 is at an angle relative to the camshaft axis 68. Actuation of the remote actuator 90 between its three rider-selectable positions, lockout, adjustable and open, that correspond to the cam surfaces 93, 95, 97, respectively, causes the driver 22 to be held at three different positions. In this embodiment, the adjuster assembly 18 includes a cable adjustment device 98 that adjusts the length of the cable 88. By adjusting the length of the cable 88, the axial position of the camshaft 68 is adjusted. Accordingly, the point at which the driver 22 engages the angled cam surface 97 is adjusted by adjusting the cable length, thereby adjusting the damping characteristics of the adjustable position corresponding to the cam surface 97, without affecting the damping characteristics of the other two positions corresponding to the cam surfaces 93, 95. The adjustment device 98 may be a barrel adjuster, which is commonly known to one skilled in the art in the bicycle industry. The barrel adjuster may be located near the camshaft 94 or near the remote actuator 90.

Figure 8A:
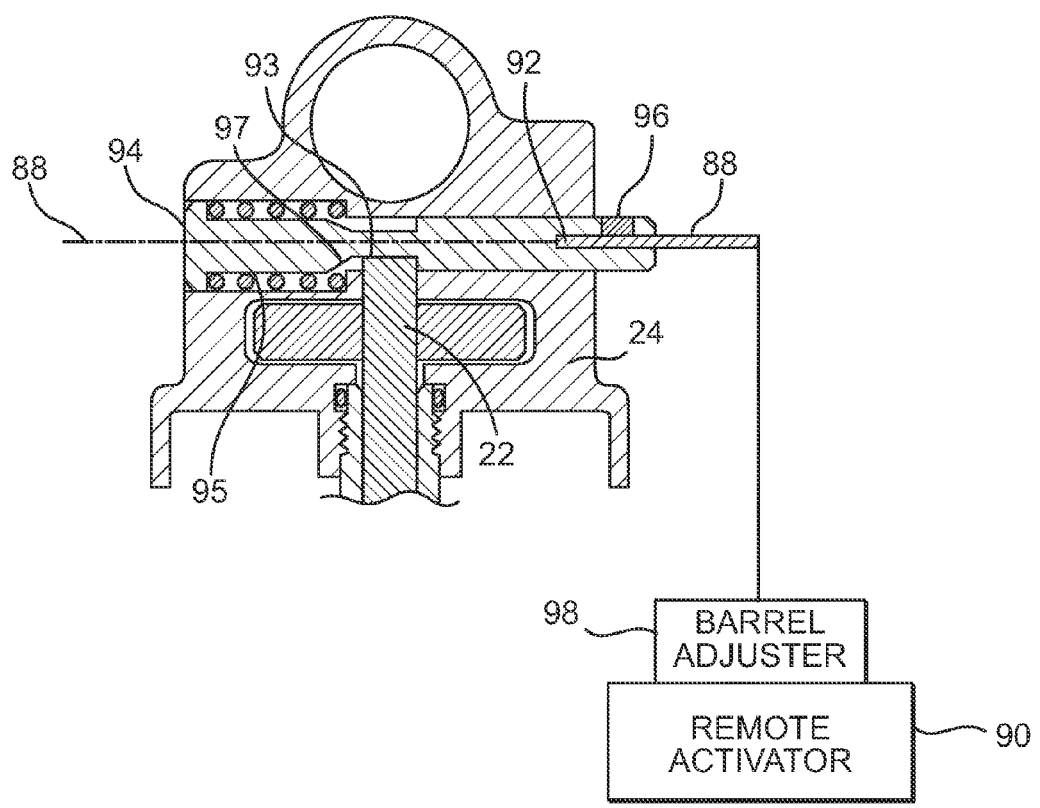

FIGS. 8a–8c show an operating sequence of the actuator when the cable adjustment device 98 is set to where the length of the cable 88 is maximized. When the remote actuator 90 is in the first position, as shown in FIG. 8a, the driver 22 is engaged with cam surface 93 and is positioned closest to the longitudinal axis 68 of the camshaft 94. When the actuator 90 is in the second position, as shown in FIG. 8b, the driver 22 is still positioned closet to the longitudinal axis 68 of the camshaft 94. When the remote actuator 90 is in the third position, as shown in FIG. 8c, the driver 22 is engaged with cam surface 95 and is positioned farthest from the longitudinal axis 68 of the camshaft 94.

Figure 9C:
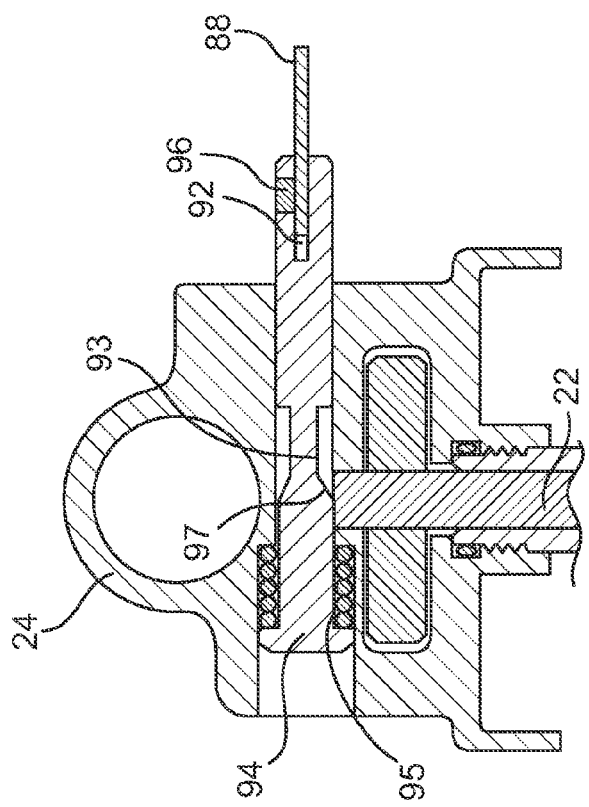

FIGS. 9a–9c show the same operating cycle as above, but the cable adjustment device 98 is set to where the length of the cable 88 is between the maximum and minimum lengths. Looking to the FIGS. 8a–8c and 9a–9c, the driver 22 position of FIG. 9a is the same as that of FIG. 8a and the driver 22 position of FIG. 9c is the same as that of FIG. 8c. However, the driver 22 position of FIG. 9b is different than the driver 22 position of FIG. 8b, since the driver 22 engages the angled cam surface 97 of the cam shaft 94.

Figure 10A:
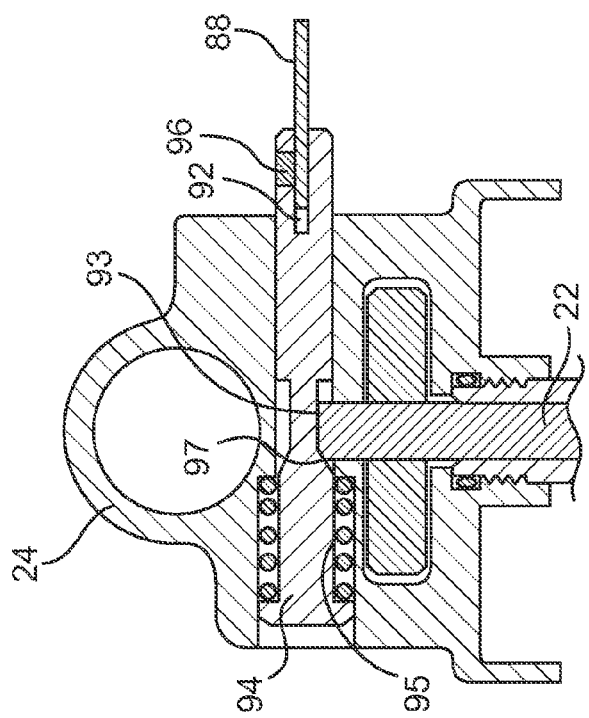
Figure 10C:
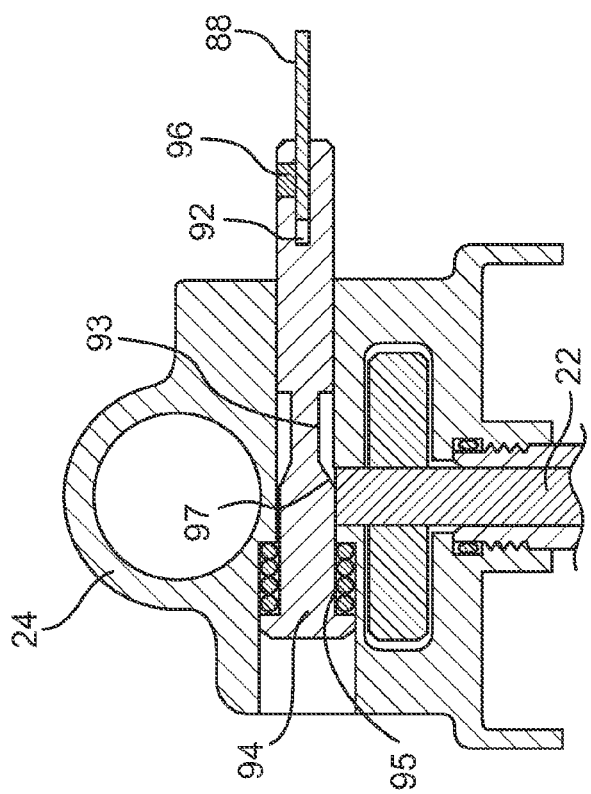
Figure 10B:
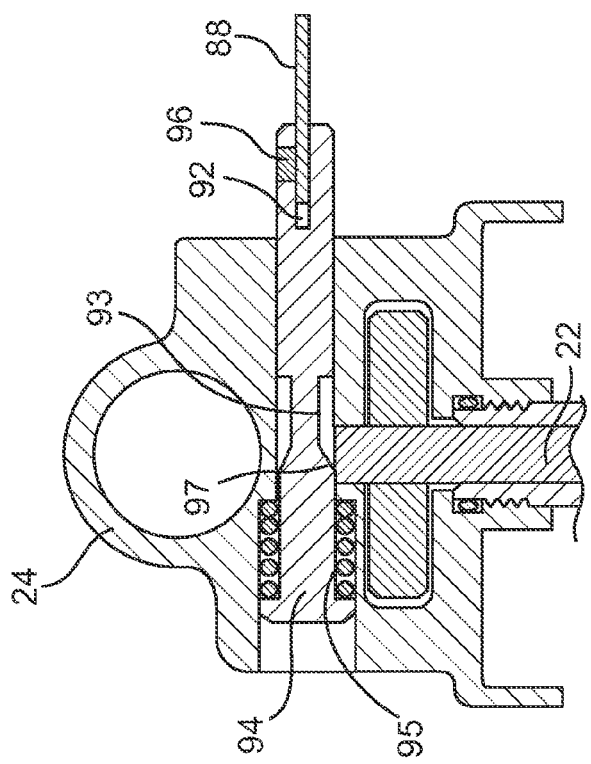

FIGS. 10a–10c show the same operating cycle, but the cable adjustment device 98 is set to where the length of the cable 88 is the shortest. Comparing FIGS. 10a–10c to FIGS. 8a–8c and FIGS. 9a–9c, the driver 22 position in FIG. 10a is the same as that of FIGS. 8a and 9a and the driver 22 position in FIG. 10c is the same as that of FIGS. 8c and 9c.

However, the driver 22 position of FIG. 10b is different than shown in either FIG. 8b or FIG. 9b. Accordingly, by adjusting the cable adjustment device 98, when the remote actuator 90 is in the second position, the driver 22 position can be varied without affecting the driver 22 positions of the first and third positions of the remote actuator 90.

Another embodiment of the present invention is shown in FIGS. 11a–g. The selector 20 of this embodiment includes a lever 102 rigidly connected to a camshaft 104 having three cam surfaces 103, 105, 107 disposed at one end of the camshaft 104. The lever 102 is operable between three positions, lockout, open and adjustable, which correspond to the three cam surfaces 103, 105, 107, respectively. All three of the cam surfaces 103, 105, 107 are substantially parallel to the longitudinal axis 112 of the camshaft 104. The selector 20 further includes a detent mechanism 114 having a ball 116, a spring 118 and a setscrew 120. The camshaft 104 has three recesses 122 for alternately receiving the ball 116. The recesses 122 are configured such that as lever 102 is rotated, the ball 116 engages each of the recesses 122 when the corresponding cam surface 103 is oriented substantially perpendicular to the longitudinal axis 60 of the driver 22. A setscrew 124 engages a groove 126 in the camshaft 104 to prevent axial movement of the camshaft 104 while still allowing rotational movement of the camshaft. The driver 22 is biased against the camshaft 104 by pressurized damping oil in the first cylinder 24. Accordingly, the axial position of the driver 22 is selected by rotating the lever 102 to select one of the desired cam surfaces 103, 105, 107 to engage the driver 22. This embodiment further includes a stop element 128 that is rotatable with the camshaft 104. The stop element 128 having a configuration such that when the lever 102 and camshaft 104 are rotated, the stop element 128 engages the adjuster assembly 18 at the extreme positions of the lever 102, and prevents over-rotation of the lever 102 and camshaft 104.

The adjuster assembly 18, in this embodiment, includes a limit screw 130 and a knob 132. The limit screw 130 is threaded into the first cylinder 24. The knob 132 has a hexagonal shaped counterbore 131 that is engageable with a corresponding hexagonal shaped head 133 of the limit screw 130 such that when the knob 132 is rotated the limit screw 130 rotates causing the limit screw 130 to displace axially relative to the knob 132. A compression spring 134 is located between the head 133 of the limit screw 130 and an end 136 of the counterbore 131 of the knob 132 for biasing the knob 132 against the first cylinder 24. The adjuster assembly 18 may further comprise a detent mechanism (not shown) that includes protrusions on the face of the knob 132 and corresponding recesses in the first cylinder 24. The protrusions alternately engage the recesses as the knob 132 is turned.

Figure 11A:
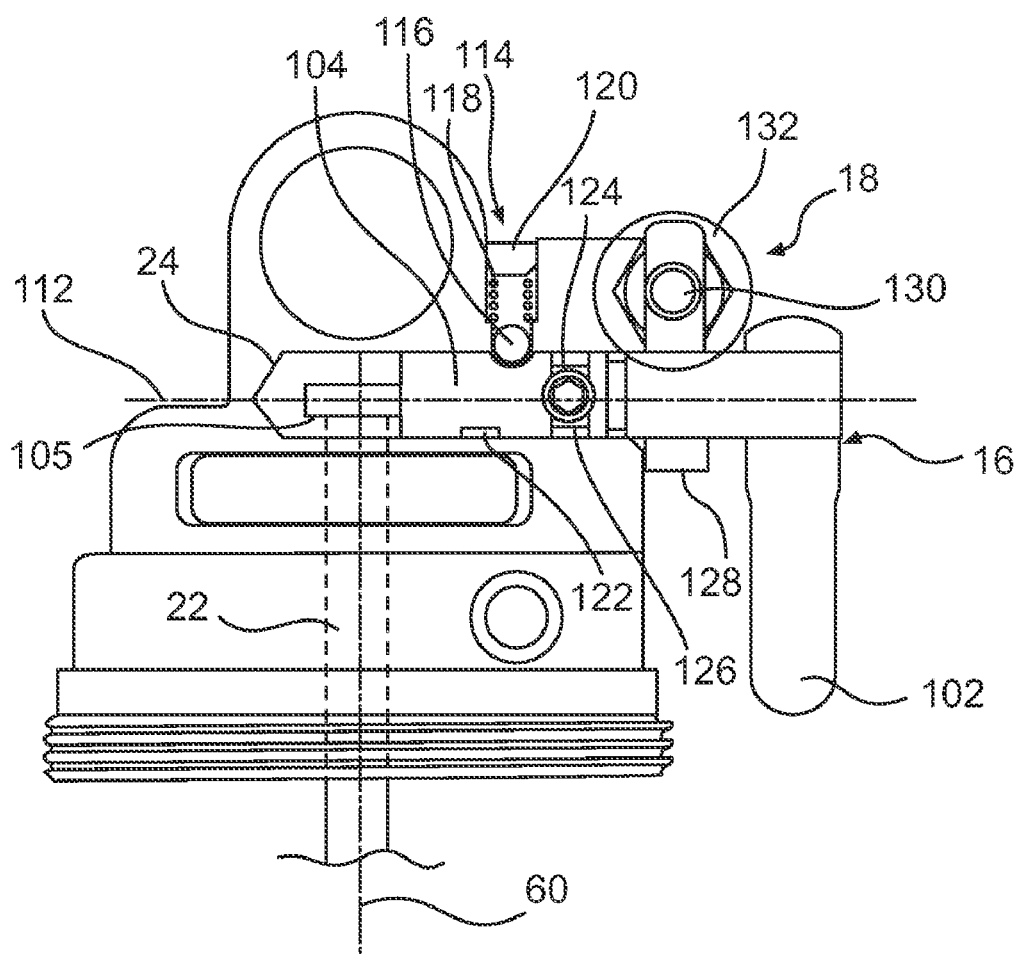
FIGS. 11a–11g are cross-sectional views of another embodiment of the present invention, showing various positions of a valve actuating assembly.
Figure 11B:
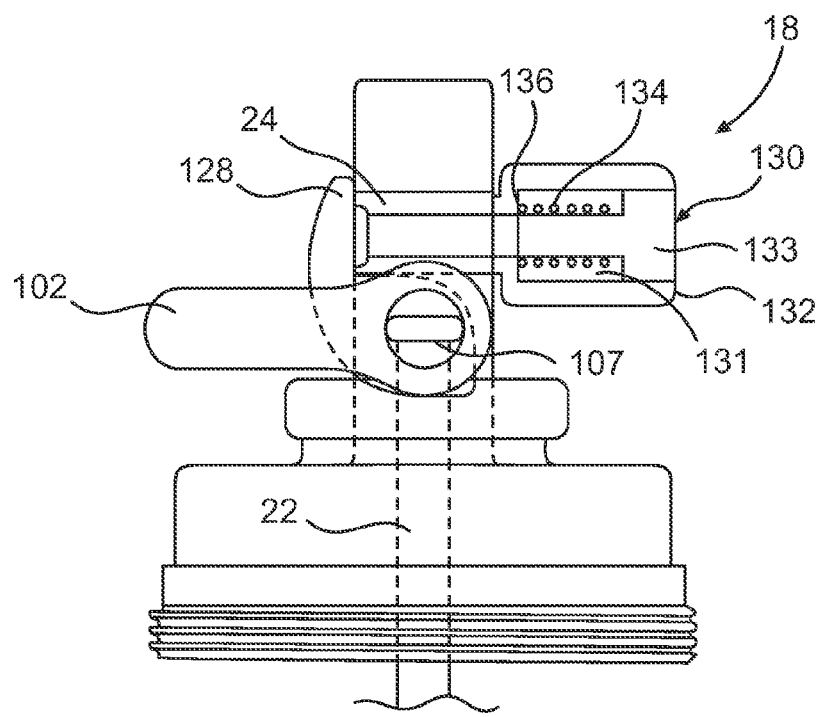
Figure 11C:
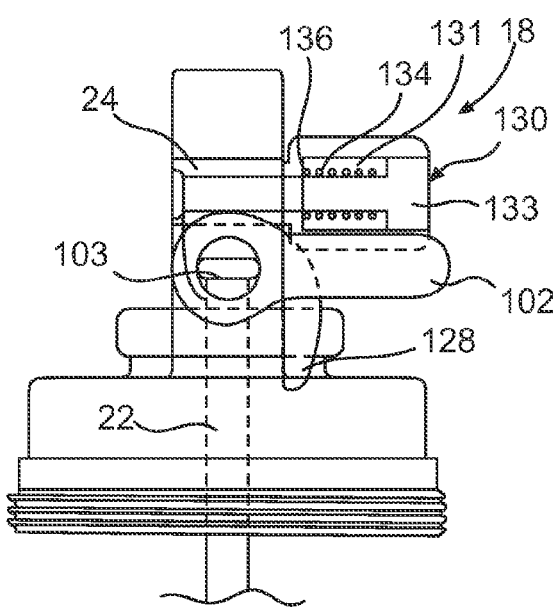
Figure 11D:
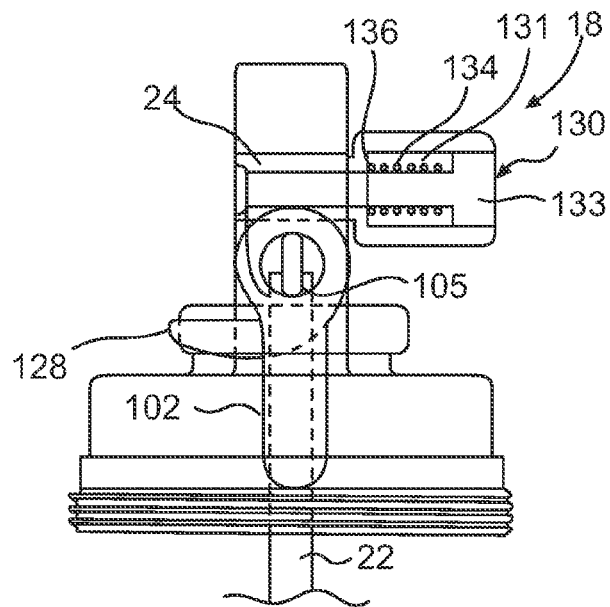
Figure 11E:
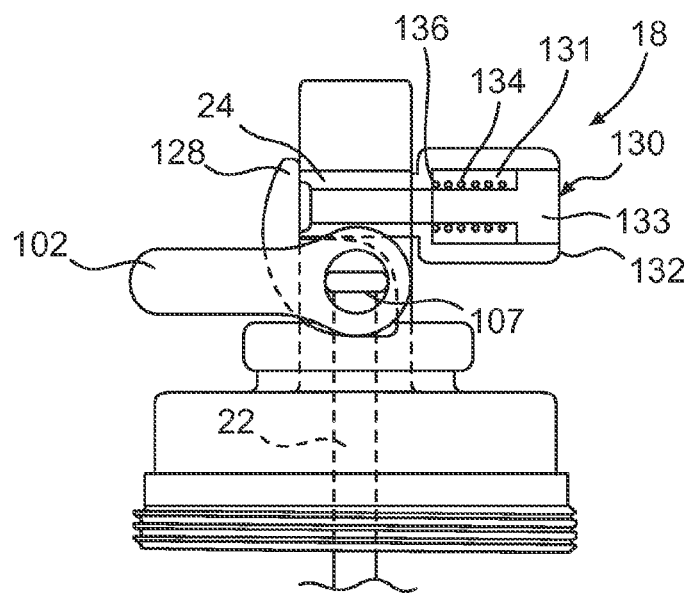
Figure 11F:
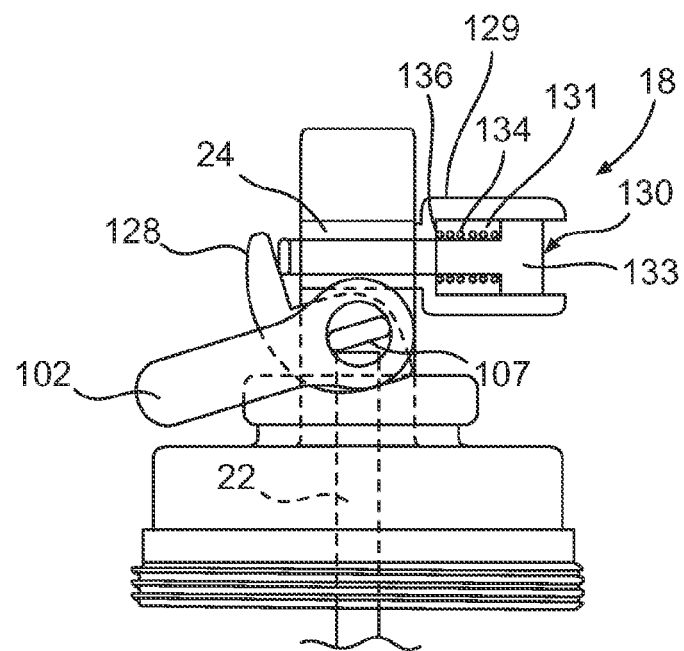
Figure 11G:
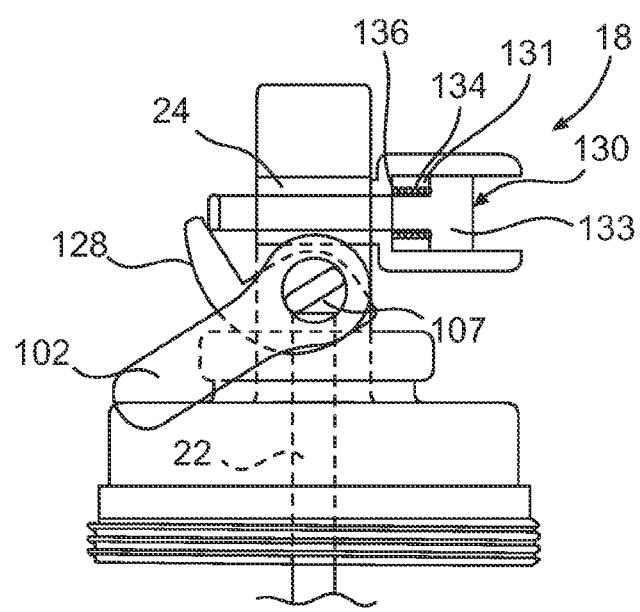

When the limit screw 130 is fully retracted, as shown in FIGS. 11c–11e, the lever 102 and camshaft 104 is rotatable 180 degrees, and all of the cam surfaces 103, 105, 107 may alternately be oriented perpendicular to the longitudinal axis 60 of the driver 22. When the limit screw 130 is partially or fully advanced, as shown in FIGS. 11f and 11g, respectively, the stop element 128 contacts the end of the limit screw 130 and prevents the lever 102 and the camshaft 104 from fully rotating to the third position. In this position, the cam surface 107 corresponding to the third position is prevented from rotating perpendicular to the longitudinal axis 60 of the driver 22 and is held at an angle relative to the driver axis 60. Looking to FIGS. 11f and 11g, when the cam surface is held at an angle, the driver 22 is at a lower axial position than compared to the other positions. Accordingly, the more the limit screw 130 is advanced, the lower the driver 22 is held. Rotation of the knob 132 allows the rider to adjust the damping characteristics of the third position without affecting the other two damping positions.

Figure 12:
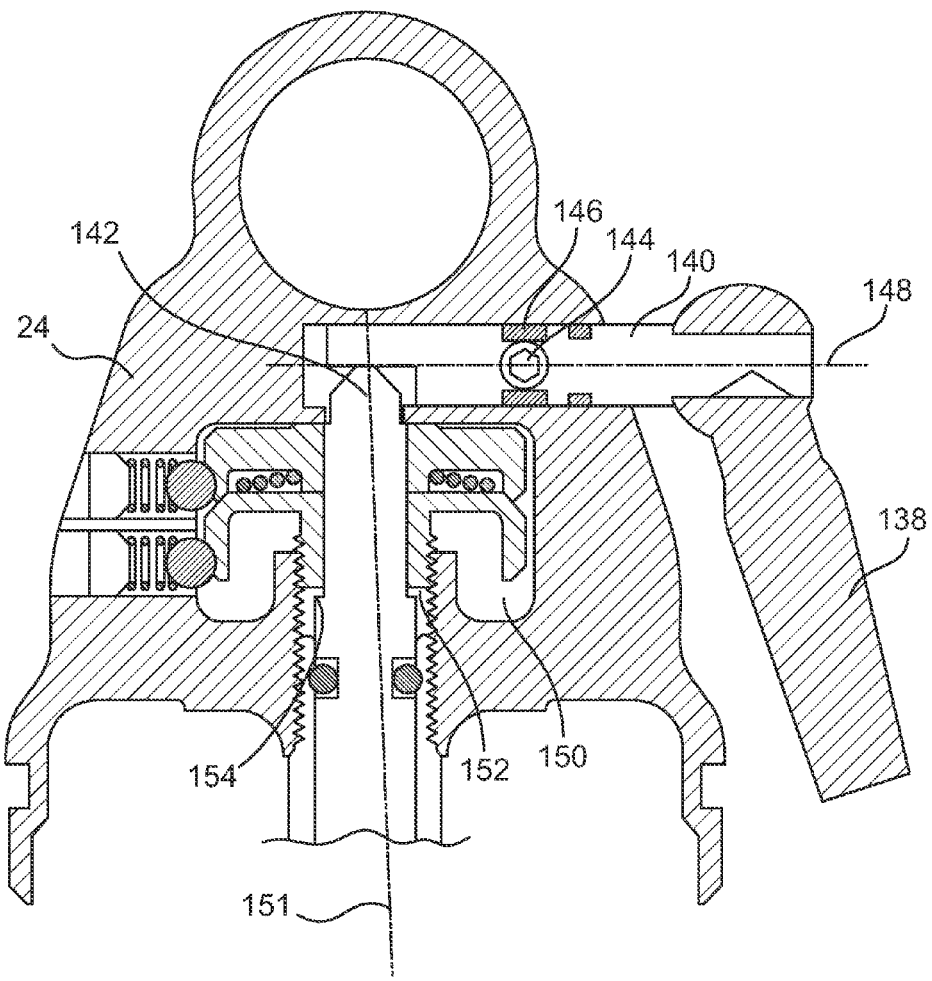
FIG. 12 is a cross-sectional view of another embodiment of the present invention, showing various positions of a valve actuating assembly.

FIG. 12 shows an another embodiment of the present invention wherein the selector 20 includes a lever 138 that is rigidly connected to a camshaft 140 having three cam surfaces. In this embodiment, the camshaft 140 is only rotatable by the lever 138 and is axially fixed by a setscrew 144 that engages a groove 146 in the camshaft 140. The three cam surfaces correspond to three rider-selectable positions of the lever and are all substantially parallel to a longitudinal axis 148 of the camshaft 140. The driver 142 is biased against the camshaft 140 by pressurized damping oil in the first cylinder 24. The adjuster assembly 18 includes a knob 150 having a through-hole 152 for receiving the driver 142. The knob 150 is threaded into the first cylinder 24 such that when the knob 150 is rotated, the driver 142 may displace along its axis 151.

When the lever 138 is rotated into the first two positions, the axial position of the driver 142 is determined by the angular position of the lever 138 and camshaft 140. When lever 138 is rotated into the third position, the adjustable position, a shoulder 154 of the driver 142 contacts the knob 150 and further rotation of the lever 138 causes the driver 142 to disengage from the camshaft 140. In this third position, the axial position of the driver 142 is determined by the axial position of the knob 150, not by the cam surface. Accordingly, the rotation of the knob 150 allows the rider to adjust the damping characteristics of the third position without affecting the damping of the first and second positions.

While this invention has been described by reference to a preferred embodiment, it should be understood that numerous changes could be made within the spirit and scope of the inventive concepts described. For example, the bicycle suspension has been depicted as a rear shock but it can take the form of a front fork, a seat post, or any other type of suspension positioned along the bicycle frame. Accordingly, it is intended that the invention not be limited to the disclosed embodiment, but that it have the full scope permitted by the language of the following claims.

What is claimed is:

1. An actuator apparatus for controlling a valve mechanism of a suspension system, the actuator apparatus comprising:
    a valve actuating assembly operatively connected to the valve mechanism, the valve actuating assembly including a camshaft rotatable between at least two positions to adjust the valve mechanism between various suspension settings; and
    an adjuster assembly operatively connected to the valve actuating assembly for adjusting the damping characteristics corresponding to at least one of the positions of the valve actuating assembly independently of the damping characteristics corresponding to another position of the valve actuating assembly.

2. The actuator apparatus of claim 1 wherein the valve actuating assembly comprises:
    a driver movable to adjust the valve mechanism between various suspension settings; and
    a selector operatively connected to the driver and rotatable between the positions.

3. The actuator apparatus of claim 2 wherein the selector comprises:
    a lever operable between the positions; and the camshaft operatively connected to the lever, and at least two cam surfaces corresponding to the positions of the lever, the cam surfaces configured to be engageable with the driver.

4. The actuator apparatus of claim 3 wherein at least one of the cam surfaces is disposed substantially parallel to the camshaft axis and at least another of the cam surfaces is disposed at an angle relative to the camshaft axis.

5. The actuator apparatus of claim 4 wherein the adjuster assembly comprises a knob operatively connected to the camshaft to axially displace the camshaft to vary the engagement point of the driver along the angled cam surface.

6. The actuator apparatus of claim 4 wherein the adjuster assembly is formed integrally with the selector of the valve actuating assembly, the camshaft threadably coupled to a housing of the suspension system to axially displace the camshaft along the housing to vary the engagement point of the driver along the angled cam surface.

7. The actuator apparatus of claim 2 wherein the selector comprises:
   a lever operable between the positions;
   the camshaft having at least two cam surfaces corresponding to the positions of the lever, the camshaft operatively connected to the lever; and
   a stop element rotatable with the selector and configured to abut against the adjuster assembly to prevent over-rotation of the lever.

8. The actuator apparatus of claim 7 wherein the cam surfaces are disposed substantially parallel to the camshaft axis.

9. The actuator apparatus of claim 8 wherein the adjuster assembly comprises a limit screw threadably coupled to a housing of the suspension system and configured to be engageable with the stop element to prevent over-rotation of the lever.

10. The actuator apparatus of claim 2 wherein the selector comprises:
    a lever operable between the positions;
    the camshaft having a plurality of cam surfaces, at least one of said cam surfaces configured to be engageable with the driver, the cam surfaces corresponding to the positions of the lever, the cam surfaces disposed substantially parallel to the axis of the camshaft, the camshaft operatively connected to the lever.

11. The actuator apparatus of claim 10 wherein the adjuster assembly is operatively connected to the driver to position the driver relative to camshaft of the selector.

12. The actuator apparatus of claim 1 wherein the positions of the valve actuating assembly are rider-selectable positions.

* * * * *